United States Patent
Matsuba et al.

(10) Patent No.: US 7,327,751 B2
(45) Date of Patent: Feb. 5, 2008

(54) METHOD AND APPARATUS FOR ACCESSING A PLURALITY OF DEVICES USING A SINGLE COMMUNICATION PORT

(75) Inventors: Yasutomo Matsuba, Ibaraki (JP); Satoru Yamauchi, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 1171 days.

(21) Appl. No.: 10/423,108

(22) Filed: Apr. 26, 2003

(65) Prior Publication Data
US 2004/0213162 A1 Oct. 28, 2004

(51) Int. Cl.
*H04J 3/16* (2006.01)
(52) U.S. Cl. ........................ 370/437; 713/313
(58) Field of Classification Search ................ 370/437, 370/389, 252, 386, 395.3, 395.4, 401, 402, 370/419, 420; 713/22, 313
See application file for complete search history.

(56) References Cited

U.S. PATENT DOCUMENTS

| | | | |
|---|---|---|---|
| 6,854,025 B2* | 2/2005 | Knight et al. ................. | 710/22 |
| 2002/0013852 A1* | 1/2002 | Janik .......................... | 709/231 |
| 2002/0116565 A1* | 8/2002 | Wang et al. ................ | 710/313 |
| 2003/0081619 A1* | 5/2003 | Phillips et al. .............. | 370/400 |

* cited by examiner

*Primary Examiner*—Brenda Pham
(74) *Attorney, Agent, or Firm*—Wade J. Brady, III; Frederick J. Telecky, Jr.

(57) ABSTRACT

A method for accessing a plurality of devices by a system using a single communication port communicatively coupled with each respective device of the plurality of devices includes the steps of: (a) in no particular order: (1) ascertaining selected operating characteristics of the system; and (2) ascertaining selected operating characteristics of each respective device; (b) calculating operating parameters of the system operating with each respective device; (c) establishing a schedule for operating the system with each respective device; and (d) operating the system with each respective device according to the schedule.

18 Claims, 4 Drawing Sheets

METHOD AND APPARATUS FOR ACCESSING A PLURALITY OF DEVICES USING A SINGLE COMMUNICATION PORT

BACKGROUND OF THE INVENTION

The present invention is directed to apparatuses for handling data, such as digital information, and especially to apparatuses for accessing a plurality of devices by a system with a plurality of devices coupled with the system via a single communication port. The apparatus is especially useful when the various devices have different operating speeds. The present invention is advantageously employed in a video recording system that exchanges digital video data with a two storage devices using a single communication port.

Many data handling apparatuses involve systems communicating at high speeds with storage devices via communication ports. Some such apparatuses have more than one storage device with which a system communicates. One example of such an apparatus is a real-time video apparatus that records a video stream to either a DVD (Digital Video Disc) or to an HDD (Hard Disc Drive) and plays back video information from those media. Controlling communications (i.e., recording and playback) with two or more media is difficult, especially when the media operate at different speeds. When different speeds are involved among various media, the slowest medium can be a bottleneck in the operation of the apparatus, effectively limiting the overall speed of operation of the apparatus.

Some prior art apparatuses seek to avoid such a bottleneck effect by providing two communication ports for carrying out required communications with two devices. One port is coupled with the slower device; the other port is coupled with the faster device. This arrangement has a drawback in that it tends to require embodiment in a physically larger product to accommodate the second communication port because two interface modules are required for the two ports. The added module also adds expense to the two port product as compared with a product having a single port.

There is a need for an apparatus and method that can carry out communications via a single communication port with a plurality of devices having different communicating speeds.

SUMMARY OF THE INVENTION

A method for accessing a plurality of devices by a system using a single communication port communicatively coupled with each respective device of the plurality of devices includes the steps of: (a) in no particular order: (1) ascertaining selected operating characteristics of the system; and (2) ascertaining selected operating characteristics of each respective device; (b) calculating operating parameters of the system operating with each respective device; (c) establishing a schedule for operating the system with each respective device; and (d) operating the system with each respective device according to the schedule.

The method may include the further steps of: (e) inquiring whether a predetermined condition has been met; and (f) if the predetermined condition has been met, performing steps (a)(2) through (d).

It is, therefore, an object of the present invention to provide a method and apparatus for accessing, or communicating via a single communication port with a plurality of devices.

It is a further object of the present invention to provide a method and apparatus for accessing, or communicating via a single communication port with a plurality of devices having different communicating speeds.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
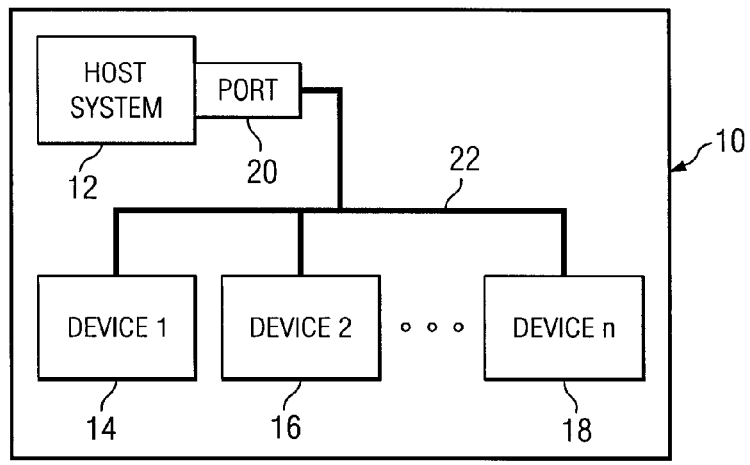
FIG. 1 is a schematic diagram illustrating an apparatus in which the present invention may be advantageously employed.

FIG. 1 is a schematic diagram illustrating an apparatus in which the present invention may be advantageously employed. In FIG. 1, an apparatus 10 includes a host system 12 and devices DEVICE 1 14, DEVICE 2 16, DEVICE n 18. The indicator "n" is employed to signify that there can be any number of devices in apparatus 10. Devices 14, 16, 18 may be, for example, storage devices for storing information for use by host system 12 or by apparatus 10. Devices 14, 16, 18 are coupled for communication with host system 12 via a communication port 20 and a communication network 22. Communication network 22 may be embodied in a local area network (LAN), a data bus or another communication arrangement. When communication speeds of the various devices 14, 16, 18 are different, the communication speed of apparatus 10 is limited to the slowest speed among devices 14, 16, 18. That is, the slowest device 14, 16, 18 is a bottleneck for apparatus 10 operations involving communication with devices 14, 16, 18.

Figure 2:
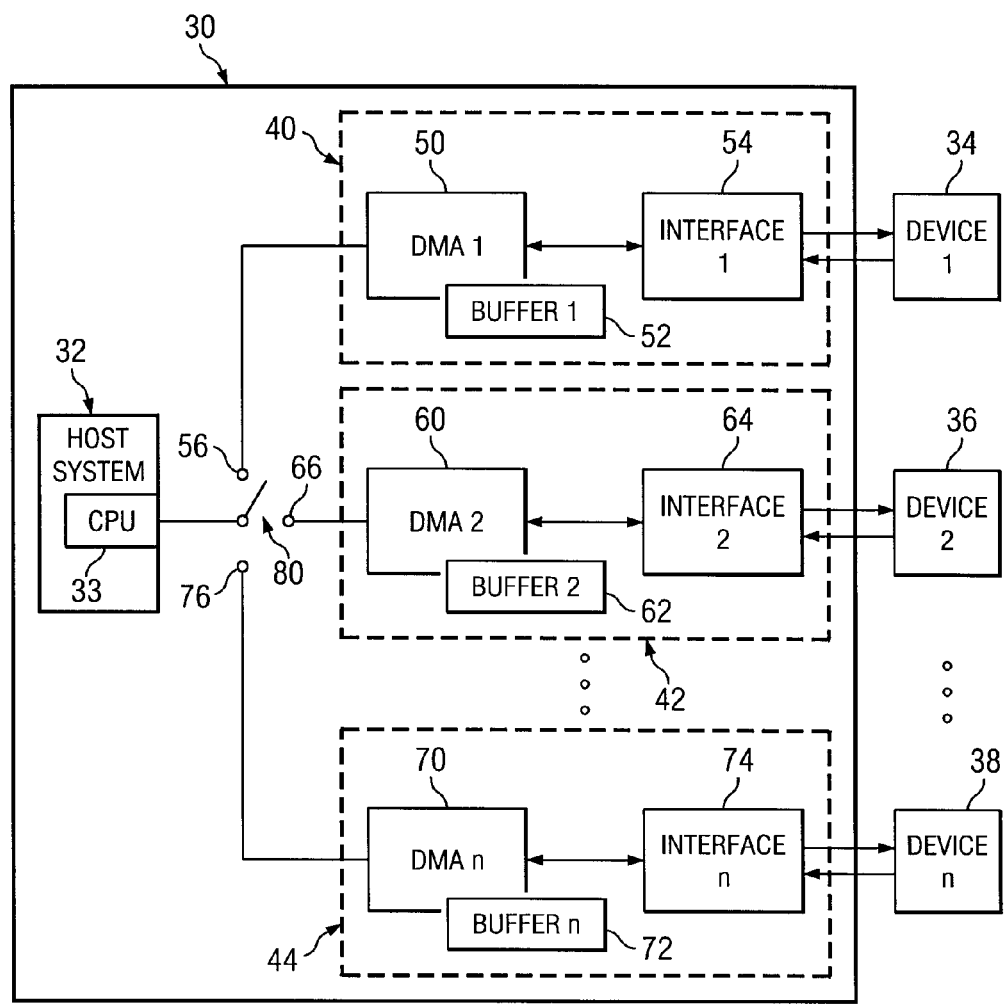
FIG. 2 is a schematic diagram illustrating a first exemplary prior art solution to communication by a system with two devices.

FIG. 2 is a schematic diagram illustrating a first exemplary prior art solution to communication by a system with two devices. In FIG. 2, an apparatus 30 includes a host system 32 and devices DEVICE 1 34, DEVICE 2 36, DEVICE n 38. The indicator "n" is employed to signify that there can be any number of devices in apparatus 30. Devices 34, 36, 38 may be, for example, storage devices for storing information for use by host system 32 or by apparatus 30. DEVICE 1 34 is coupled for communication with host system 32 via a communication port 40. DEVICE 2 36 is coupled for communication with host system 32 via a communication port 42. DEVICE n 38 is coupled for communication with host system 32 via a communication port 44.

Communication port 40 includes a Direct Memory Access device DMA 1 50 with a buffer BUFFER 1 52. Direct Memory Access device DMA 1 50 is coupled with an interface device INTERFACE 1 54. DEVICE 1 34 is communicatively coupled with interface device INTERFACE 1 54. Direct Memory Access device DMA 1 50 is coupled with a terminal 56. Communication port 42 includes a Direct Memory Access device DMA 2 60 with a buffer BUFFER 2 62. Direct Memory Access device DMA 2 60 is coupled with an interface device INTERFACE 2 64. DEVICE 2 36 is communicatively coupled with interface device INTERFACE 2 64. Direct Memory Access device DMA 2 60 is coupled with a terminal 66. Communication port 44 includes a Direct Memory Access device DMA n 70 with a buffer BUFFER n 72. Direct Memory Access device DMA n 70 is coupled with an interface device INTERFACE n 74. DEVICE n 38 is communicatively coupled with interface device INTERFACE n 74. Direct Memory Access device DMA n 70 is coupled with a terminal 76. Host system 32 includes a processor (Central Processing Unit; CPU) 33. CPU 33 controls many operations of host system 32, including control of a switching device 80 for selectively engaging one of terminals 56, 66, 76 to effect selective coupling of host system 32 for communication with one of devices 34, 36, 38 via one of communication ports 40, 42, 44.

As mentioned earlier herein, such an arrangement using multiple communication ports to accommodate varied communication speeds of devices has a drawback in that it tends to require embodiment in a physically larger product to accommodate the several communication ports because an interface module is required for each respective port. The added modules also add expense to the multi-port product as compared with a product having a single port.

Figure 3:
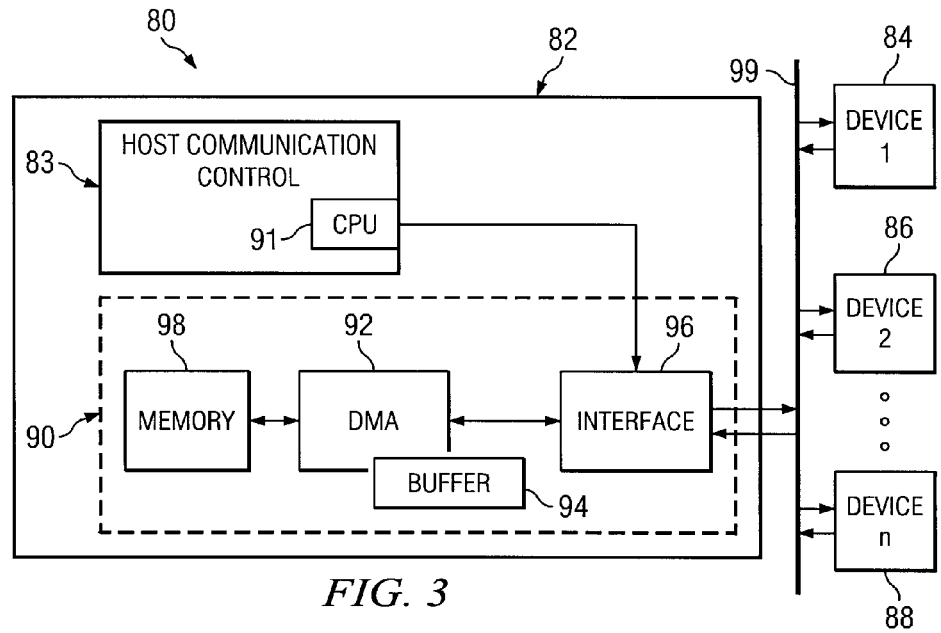
FIG. 3 is a schematic diagram illustrating a second exemplary prior art solution to communication by a system with a two devices.

FIG. 3 is a schematic diagram illustrating a second exemplary prior art solution to communication by a system with a two devices. In FIG. 3, an apparatus 80 includes a host system 82 and devices DEVICE 1 84, DEVICE 2 86, DEVICE n 88. The indicator "n" is employed to signify that there can be any number of devices in apparatus 80. Devices 84, 86, 88 may be, for example, storage devices for storing information for use by host system 82 or by apparatus 80. Each of DEVICE 1 84, DEVICE 2 86, DEVICE n 88 is coupled for communication with host system 82 via a bus 99 and a communication port 90. Communication port 90 includes a Direct Memory Access device 92 with a buffer 94. A memory unit 98 is provided coupled with direct memory access device 92 to store information relating to operation of communication port 90. Direct Memory Access device 92 is coupled with an interface device 96. Each of DEVICE 1 84, DEVICE 2 86, DEVICE n 88 is coupled is communicatively coupled with interface device 96 via bus 99. Host system 82 includes a host communication control unit 83 coupled with interface device 96 for controlling communication between devices DEVICE 1 84, DEVICE 2 86, DEVICE n 88 and communication port 90. Host communication control unit 83 includes a processor device (central processing unit; CPU) 91 coupled with communication port 90. CPU 91 and interface 96 cooperate with DMA 92, memory 98, buffer 94 and bus 99 to control communications with one or more of devices 84, 86, 88 generally according to programming driving CPU 91.

Such an arrangement using a single communication port to accommodate varied communication speeds of devices has a drawback in that it is difficult to design a system that controls the data communication among host system 82 and devices 84, 86, 88, especially when operating speeds vary among devices 84, 86, 88. In practical terms, it is difficult to design the programming that controls operation of CPU 91 to carry out the required communications among devices 84, 86, 88 having various operating speeds while minimizing waiting time of host system 82.

Figure 4:
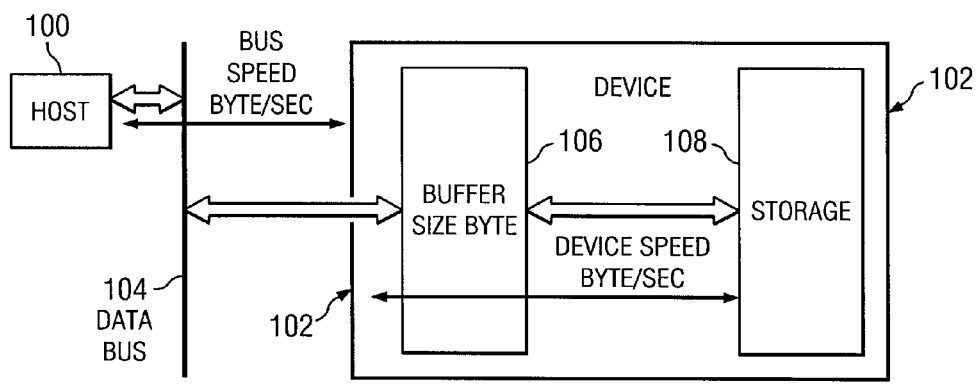
FIG. 4 is a schematic diagram illustrating certain parameters associated with exchange of data between a system and a device.

FIG. 4 is a schematic diagram illustrating certain parameters associated with exchange of data between a system and a device. In FIG. 4, a host system 100 communicates with a device 102 via a data bus 104. Device 102 includes a buffer 106 that is in communication with host system 100 via data bus 104 and is in communication with a storage unit 108 within device 102. The term "bus speed" relates to the speed at which data is transferred between host system 100 and device 102 on data bus 104. Bus speed may be expressed in bytes/second. The term "buffer size" relates to the data capacity of buffer 106 and may be expressed in bytes. The term "device speed" relates to the speed at which data is transferred between buffer 106 and storage unit 108. For example, if storage unit 108 is a DVD disk in a DVD drive unit, "device speed" may reflect the speed at which a laser may write data to the DVD disk. Device speed may be expressed in bytes/second.

Figure 5:
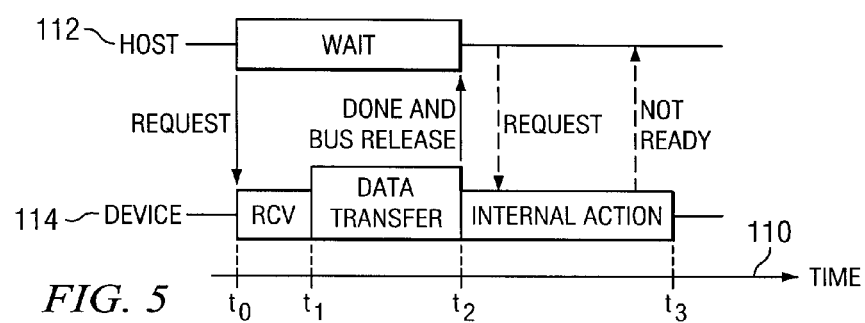
FIG. 5 is a diagram illustrating representative timing of events associated with access between a system and a device during an exchange of data.

FIG. 5 is a diagram illustrating representative timing of events associated with access between a system and a device during an exchange of data. In FIG. 5, a representative data transaction between a host 112 and a device 114 is illustrated as a function of time (time axis 110). A transaction begins with host 112 issuing a request to device 114, at a time $t_0$. Host 112 enters a wait period during an interval $t_0$-$t_2$ knowing that device 114 will take some time to respond to the request sent at time $t_0$. Device 114 is occupied seeking the data requested at time to during a period $t_0$-$t_1$ known as "Seek Time". Device 114 begins to transfer the requested data to host 112 at time $t_1$. The data transfer is completed at a time $t_2$. Thus Data Transfer Time is indicated by interval $t_1$-$t_2$ in FIG. 5. Device 114 continues with internal action (e.g., internal "housekeeping" or "overhead" activities, such as arranging stored data for efficient storage and later retrieval) associated with the data transfer during a period $t_2$-$t_3$. The overhead activities occupy device 114 during period $t_2$-$t_3$ so that a request by host 112 during the period $t_2$-$t_3$ cannot be handled by device 114, and device 114 responds that it is busy when receiving any requests from host 112 until time $t_3$. "Cycle time" refers to the time between device 114 receiving a first request and the time that device 14 can respond to a second request. Cycle time is represented by interval $t_0$-$t_3$ in FIG. 5. "Data transfer time" refers to the time it takes device 114 to transfer the requested data to host 114. Data transfer time is represented by interval $t_1$-$t_2$ in FIG. 5. "Busy time" refers to the time occupied by device 114 processing an internal action. Busy time is represented by interval $t_2$-$t_3$ in FIG. 5.

In its preferred embodiment, the method of the present invention begins with, in no particular order, ascertaining operating characteristics of the host system and each respective device that is to communicate with the host system. That is, first one preferably ascertains buffer size of the device buffer (e.g., buffer 106; FIG. 4), and the maximum supported data size and actual data size (in bytes) that is to be employed in communication. The actual data size must be less than or equal with the lesser of the maximum supported data size and the buffer size. Maximum bus speed (e.g., for data bus 104; FIG. 4), device speed (e.g., for device 103; FIG. 4) and seek time (e.g., interval $t_0$-$t_1$; FIG. 5) are also ascertained for each device. Actual bus speed is preferably determined according to a target speed of the real-time system being studied so that target speed<bus speed≦maximum bus speed. Ascertainment may be effected beforehand based upon specifications of components involved (e.g., host, devices and data bus). Alternatively, at least some ascertainment may be effected on-line by appropriate systemic queries by a controller (e.g., a microprocessor device) to various components and data traffic involved.

Second, one preferably determines some parameters that are calculated from ascertained parameters;

$$\text{Cycle Time} = \frac{DataSize}{DeviceSpeed} \quad [1]$$

$$\text{Data Transfer Time} = \text{Seek Time} + \frac{DataSize}{BusSpeed} \quad [2]$$

$$\text{Busy Time} = \text{Cycle Time} - \text{Data Transfer Time} \quad [3]$$

These calculated values determined by expressions [1], [2] and [3] are used to determine an access schedule for a host with respect to devices in the next method step.

The third step of the method of the present invention involves determining a communication or access schedule for a host device. In order to effect real-time performance of the system that includes a host system, data bus and devices (e.g., storage devices) a scheduling policy is preferably established, such as:

(1) Decrease non-communication time to effect efficient use of the data bus; and
(2) Avoid wasted communication.

Referring to FIG. 5, when a particular device 114 is busy, as during interval $t_2$-$t_3$, host system 112 cannot access device 114. However, host system 112 can access another device (not shown in FIG. 5) during that interval. Without a schedule, when a host system accesses a first device (e.g., device 114; FIG. 5) and receives an indication that the first device 114 is busy, as by receiving a "device not ready" response from the first device 114, the host system must spend some time interpreting that response. That is a waste of time that could be more advantageously spent accessing a second device. Using the calculations indicated by expressions [1], [2] and [3], a host system 112 can predict when the first device 114 will be busy. The schedule determined according to the method of the present invention preferably reflects such predictive capability and incorporates such predictions into a schedule. Such incorporation of predictions into a schedule fulfils the desired policy set forth above, avoids wasted time accessing a device known to be busy and frees the host system to access another device known to be not busy.

Ascertainment and calculation of operating characteristics may be effected periodically to ensure that the schedule of the current invention is up-to-date to accommodate changing situations. That is, on-line systemic queries by a controller (e.g., a microprocessor device) to various components and data traffic involved may be periodically repeated based upon some operational characteristic reaching a predetermined limit, based upon elapsing of a predetermined time period or based upon another occasion, and new operational characteristics thus obtained may be employed to carry out the method of the present invention anew to create an updated schedule.

Figure 6:
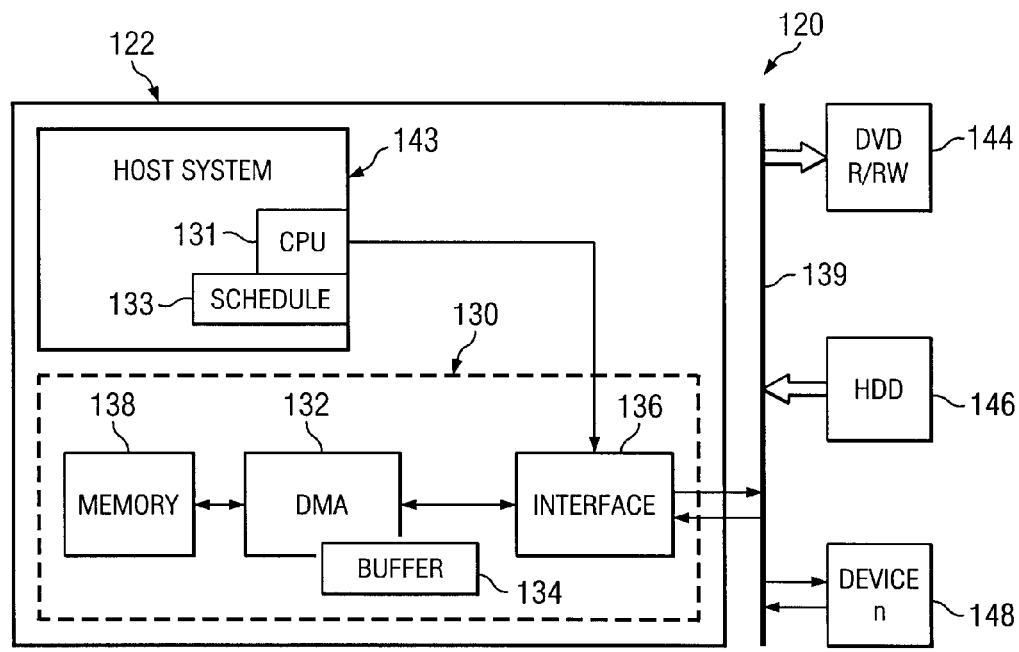
FIG. 6 is a schematic diagram illustrating the apparatus of the present invention.

FIG. 6 is a schematic diagram illustrating the apparatus of the present invention. In FIG. 6, an apparatus 120 includes a host system 122 and devices 144, 146, 148. By way of example and not by way of limitation, device 144 may be embodied in a digital video disc record and rewrite (DVD R/RW) storage device, device 146 may be embodied in a hard disc drive (HDD) storage device and device 146 may be embodied in another device for storage or for another purpose to support operations of host device 122. The indicator "n" is employed to identify device 148 to signify that there can be any number of devices in apparatus 120. Each of devices 144, 146, 148 is coupled for communication with host system 122 via a bus 139 and a communication port 130. Communication port 130 includes a Direct Memory Access device 132 with a buffer 134. A memory unit 138 is coupled with direct memory access device 132 to store information relating to operation of communication port 130. Direct Memory Access device 132 is coupled with an interface device 136. Each of devices 144, 146, 148 is coupled is communicatively coupled with interface device 136 via bus 139. A host communication control unit 143 is coupled with interface device 136 for controlling communication among devices 144, 146, 148 and communication port 130. Host communication control unit 143 includes a processor device (central processing unit; CPU) 131 coupled with communication port 130. CPU 131 is configured for employing a schedule 133 for accessing devices 144, 146, 148. Schedule 133 may be stored within memory incorporated in CPU 131 or stored elsewhere and available to CPU 131 as needed (not shown in detail in FIG. 6). CPU 131 uses schedule 133 to operate interface 136 in cooperation with DMA 132, memory 138, buffer 134 and bus 139 to control communications with one or more of devices 144, 146, 148 generally according to schedule 133 and programming driving CPU 131. In the preferred embodiment of apparatus 120 (FIG. 6), schedule 133 is created using method steps according to the method of the present invention.

Apparatus 120 (FIG. 6) uses a single communication port to accommodate varied communication speeds of devices effectively and efficiently controls the data communication among host system 142 and devices 144, 146, 148, especially when operating speeds vary among devices 144, 146, 148. In practical terms, schedule 133 affects programming that controls operation of CPU 131 to carry out the required communications among devices 144, 146, 148 having various operating speeds while minimizing waiting time of host system 122.

Figure 7:
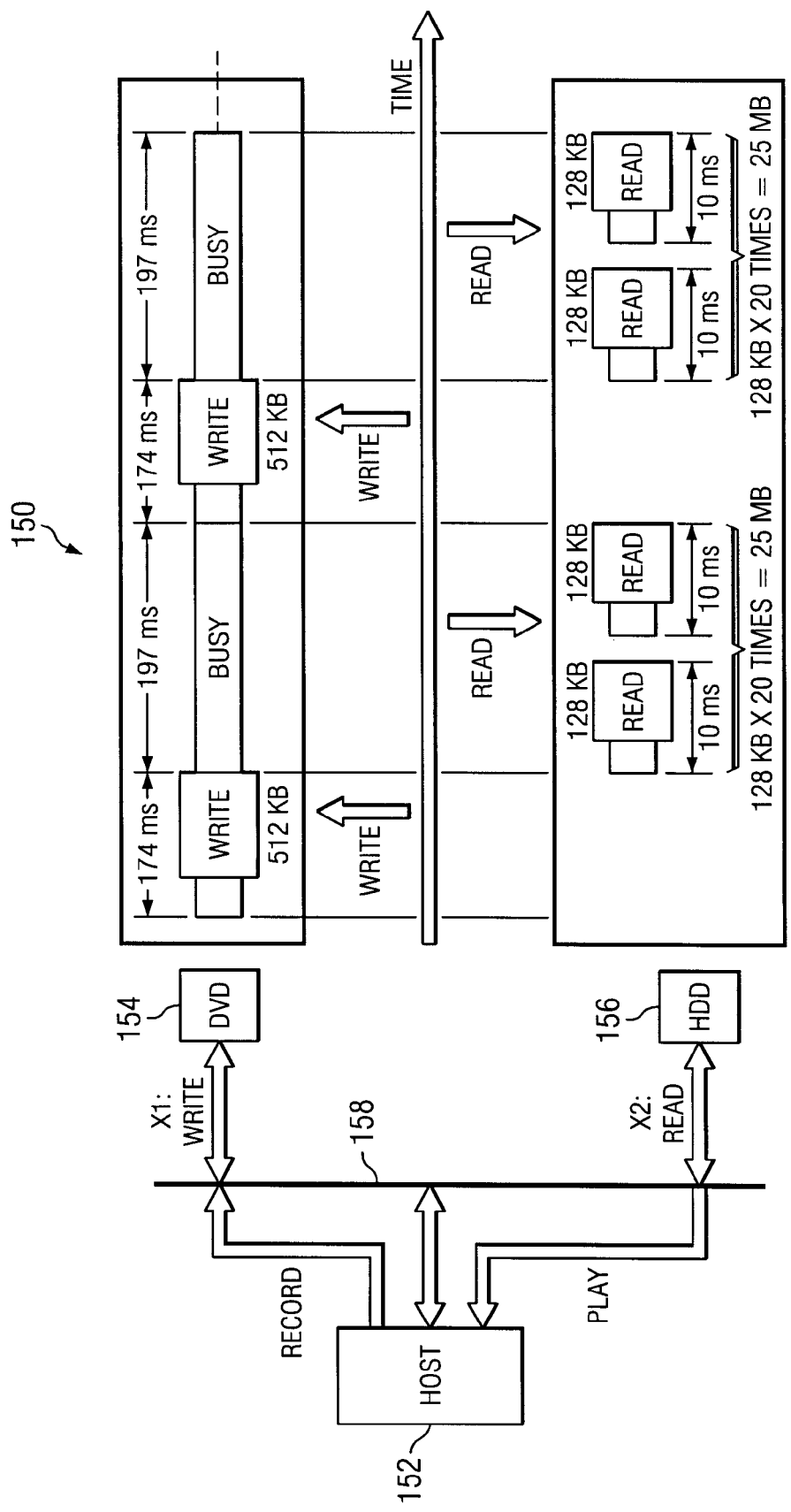
FIG. 7 is a schematic diagram illustrating an exemplary employment of the present invention in a video recording and playback system.

FIG. 7 is a schematic diagram illustrating an exemplary employment of the present invention in a video recording and playback system. In FIG. 7, an apparatus 150 includes a host system 152 and devices 154, 156 communicating via a data bus 158. By way of example and not by way of limitation, device 154 may be embodied in a digital video disc record and rewrite (DVD R/RW) storage device and device 156 may be embodied in a hard disc drive (HDD) storage device.

The method of the present invention may be applied to exemplary apparatus 150 as follows (exemplary operational parameters are provided to illustrate implementation of the method steps):

Step 1—In no particular order,
Specifications of devices 154, 156 are ascertained:

DVD Drive 154:
    Buffer size: 2 MB (megabytes)
    Maximum bus speed: 16.6 MB/sec (megabytes per second)
    Supporting maximum data size: 130 MB
    Device speed: 1.38 MB/sec
    Seek time: 20 ms (milliseconds)

-continued

HDD Drive 156:
    Buffer size: 2 MB
    Maximum bus speed: 100 MB/sec
    Supporting maximum data size: 128 KB (kilobytes)
    Device speed: bus speed + seek time
    Seek Time: 6 ms
Operational characteristics of devices 154, 156 are ascertained:
    DVD Drive 154:
        Data size = 521 KB ≦ lesser of buffer size (2 MB) and
            supporting maximum data size (130 MB)
        Bus speed = 3.33 MB/sec ≦ maximum bus speed (16.6
            MB/sec)
    HDD Drive 156:
        Data size = 512 KB < lesser of buffer size (2 MB) and
            supporting maximum data size (128 MB)
        Bus speed = 33.3 MB/sec ≦ maximum bus speed (100
            MB/sec)

Step 2—Values are calculated using expressions [1], [2] and [3]:

DVD Drive 154:

$$\text{Cycle Time} = \frac{DataSize}{DeviceSpeed} = \frac{512\text{ KB}}{1.38\text{ MB/sec}} = 371\text{ ms} \quad [1]$$

$$\text{Data Transfer Time} = \text{Seek Time} + \frac{DataSize}{BusSpeed} \quad [2]$$

$$= 20\text{ ms} + \frac{512\text{ KB}}{3.33\text{ MB/sec}}$$

$$= 20\text{ ms} + 154\text{ ms}$$

$$= 174\text{ ms}$$

$$\text{Busy Time} = \text{Cycle Time} - \text{Data Transfer Time} \quad [3]$$

$$= 371\text{ ms} - 174\text{ ms}$$

$$= 197\text{ ms}$$

HDD Drive 156:

Because HDD Drive 156 is a quick response device, no busy interval occurs, and cycle time depends upon bus speed. Thus:

$$\text{Data Transfer Time} = \text{Seek Time} + \frac{DataSize}{BusSpeed} \quad [2]$$

$$= 6\text{ ms} + \frac{128\text{ KB}}{33.3\text{ MB/sec}}$$

$$= 6\text{ ms} + 4\text{ ms}$$

$$= 10\text{ ms}$$

$$\text{Busy Time} = \text{Cycle Time} - \text{Data Transfer Time}$$

$$\therefore \text{Cycle Time} = \text{Busy Time} - \text{Data Transfer Time} \quad [3]$$

$$= 0 + 10\text{ ms}$$

$$= 10\text{ ms}$$

Step 3—Define schedule for communications with DVD device or drive 154 and HDD device or drive 156. As illustrated in FIG. 7, a WRITE operation to DVD drive 154 occupies 174 ms and DVD drive device 154 is busy for a period of 197 ms following a WRITE operation. The period during which DVD device 154 is busy (197 ms) may be predicted and may be used to carry out forty READ accesses of HDD drive 156 (taking 10 ms each). Using such a schedule, one may read 25 MB of information from HDD drive 156 during the interval that DVD drive 154 is busy, and idle time spent waiting by host 152 is minimized. In this example, idle time by host system 152 is zero.

Apparatus 150 (FIG. 7) uses a single communication port to accommodate varied communication speeds of devices effectively and efficiently controls the data communication among host system 152 and devices 154, 156 while minimizing waiting time of host system 152, even though devices 154, 156 have different operating speeds.

Figure 8:
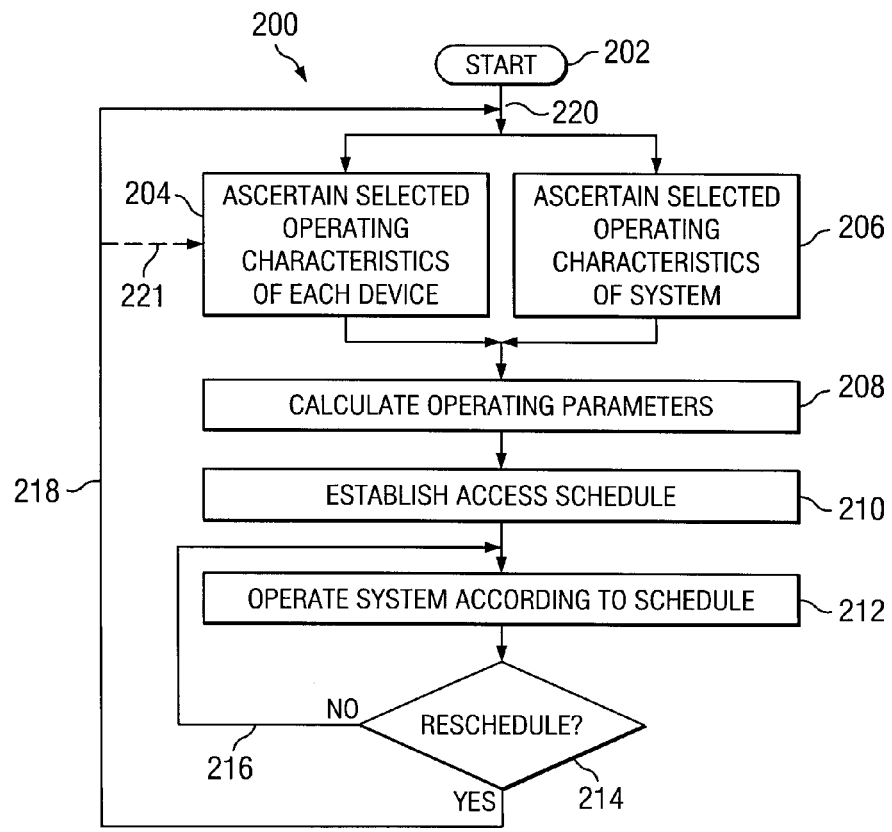
FIG. 8 is a flow chart illustrating the method of the present invention.

FIG. 8 is a flow chart illustrating the method of the present invention. In FIG. 8, a method 200 for accessing a plurality of devices by a system using a single communication port communicatively coupled with each respective device begins at a START locus 202. Method 200 continues with the step of, in no particular order, (1) ascertaining selected operating characteristics of the system, as indicated by a block 204, and (2) ascertaining selected operating characteristics of each the respective device, as indicated by a block 206. Method 200 continues with the step of calculating operating parameters of the system operating with each the respective device, as indicated by a block 208. Method 200 continues with the step of establishing a schedule for operating the system with each the respective device, as indicated by a block 210. Method 200 continues with the step of operating the system with each respective device according to the schedule, as indicated by a block 212.

Method 200 may continue with the step of inquiring whether a predetermined condition has been met, as indicated by a query block 214. The query posing represented by query block 214 may be effected periodically to ensure that the schedule of the current invention is up-to-date to accommodate changing situations. That is, on-line systemic queries by a controller (e.g., CPU 131; FIG. 6) to various components and data traffic involved may be periodically repeated based upon some operational characteristic reaching a predetermined limit, based upon elapsing of a predetermined time period or based upon another occasion.

If the predetermined condition has been met, method 200 proceeds from query block 214 according to YES response line 218 and method 200 returns to juncture 220 to again ascertain selected operating characteristics of the system and each device. New operational characteristics thus obtained may be employed to carry out the method of the present invention anew to create an updated schedule. Alternatively, method 200 may proceed from query block 214 according to YES response lines 220, 221 to return to block 204, so that only selected operating characteristics of devices are reascertained for creating an updated schedule. The alternate nature of this method step is illustrated by response line 221 being indicated in a dotted line format.

If the predetermined condition has not been met, method 200 proceeds from query block 214 according to NO response line 216 and the system continues to operate according to the then-extant schedule.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for accessing a plurality of devices by a system using a single communication port; said communication port being communicatively coupled with each respective device of said plurality of devices; the method comprising the steps of:
   (a) in no particular order:
      (1) ascertaining selected operating characteristics of said system; and
      (2) ascertaining selected operating characteristics of each said respective device;
   (b) calculating operating parameters of said system operating with each said respective device;
   (c) based on said calculated operating parameters, establishing a schedule for operating said system with each said respective device; and
   (d) operating said system with each said respective device according to said schedule;
   wherein said schedule establishes operational sequences among said system and said plurality of devices to effect non-interfering accessing of each said respective device by said system while minimizing waiting time by said system.

2. A method for accessing a plurality of devices by a system using a single communication port as recited in claim 1 wherein the method comprises the further steps of:
   (e) inquiring whether a predetermined condition has been met; and
   (f) if said predetermined condition has been met, performing steps (a)(2) through (d).

3. A method for accessing a plurality of devices by a system using a single communication port as recited in claim 2 wherein said schedule establishes operational sequences among said system and said plurality of devices to effect non-interfering accessing of each said respective device by said system while minimizing waiting time by said system.

4. A method for accessing a plurality of devices by a system using a single communication port as recited in claim 1 wherein said system is a video system, and wherein said plurality of devices is two devices, said video system and said plurality of devices cooperating to record and play video information.

5. A method for accessing a plurality of devices by a system using a single communication port as recited in claim 4 wherein said two devices comprise a first storage device and a second storage device; said first storage device permitting a faster access speed by said system than said second storage device.

6. A method for accessing a plurality of devices by a system using a single communication port as recited in claim 2 wherein said system is a video system, and wherein said plurality of devices is two devices, said video system and said plurality of devices cooperating to record and play video information.

7. A method for accessing a plurality of devices by a system using a single communication port as recited in claim 6 wherein said two devices comprise a first storage device and a second storage device; said first storage device permitting a faster access speed by said system than said second storage device.

8. A method for accessing a plurality of devices by a system using a single communication port as recited in claim 1 wherein said system is a video system, and wherein said plurality of devices is two devices, said video system and said plurality of devices cooperating to record and play video information.

9. A method for accessing a plurality of devices by a system using a single communication port as recited in claim 8 wherein said two devices comprise a first storage device and a second storage device; said first storage device permitting a faster access speed by said system than said second storage device.

10. A method for accessing a plurality of devices by a system using a single communication port as recited in claim 3 wherein said system is a video system, and wherein said plurality of devices is two devices, said video system and said plurality of devices cooperating to record and play video information.

11. A method for accessing a plurality of devices by a system using a single communication port as recited in claim 10 wherein said two devices comprise a first storage device and a second storage device; said first storage device permitting a faster access speed by said system than said second storage device.

12. A method for effecting communications among a system, a first storage device and a second storage device; said first storage device and said second storage device being communicatively coupled with said system via a communication port; the method comprising the steps of:
   (a) in no particular order:
      (1) ascertaining at least one operating characteristic of said system; and
      (2) ascertaining at least one operating characteristic of each of said first storage device and said second storage device;
   (b) in no particular order:
      (1) calculating at least one first operating parameter of said system in operating with said first storage device; and
      (2) calculating at least one second operating parameter of said system in operating with said second storage device;
   (c) establishing a schedule for effecting operation of said system with said first storage device and said second storage device; said schedule establishing operational sequences among said system, said first storage device and said second storage device to effect non-interfering access of each of said first storage device and said second storage device by said system while minimizing waiting time by said system; and
   (d) operating said system substantially according to said schedule.

13. A method for effecting communications among a system, a first storage device and a second storage device as recited in claim 12 wherein the method comprises the further steps of:
   (e) inquiring whether a predetermined condition has been met; and
   (f) if said predetermined condition has been met, performing steps (a)(2) through (d).

14. A method for effecting communications among a system, a first storage device and a second storage device as recited in claim 12 wherein said system is a video system, and wherein said plurality of devices is two devices, said video system and said plurality of devices cooperating to record and play video information.

15. A method for effecting communications among a system, a first storage device and a second storage device as recited in claim 14 wherein said first storage device permits a faster access speed by said system than said second storage device.

16. A method for effecting communications among a system, a first storage device and a second storage device as recited in claim 13 wherein said system is a video system, and wherein said plurality of devices is two devices, said video system and said plurality of devices cooperating to record and play video information.

17. A method for effecting communications among a system, a first storage device and a second storage device is recited in claim 16 wherein said first storage device permits a faster access speed by said system than said second storage device.

18. An apparatus for handling digital information comprising:
 (a) a system having a communication port for conveying data; said system having a processor device coupled with said communication port;
 (b) at least one storage device; each respective storage device of said at least one storage device being coupled with said system via said communication port for exchanging said data with said system; each said respective storage device having at least one operating parameter limiting said exchanging said data;
 (c) a schedule accessible to said processor device for establishing timing for communication among said system and said at least one storage device to effect non-interfering accessing of each said respective storage device by said system while minimizing waiting time by said system; said processor device substantially implementing said schedule in effecting said exchanging said data;
 wherein said processor receives information from each said respective storage device, employs said information to determine said at least one operating parameter and employs at least one of said information and said at least one operating parameter to establish said schedule.

\* \* \* \* \*